United States Patent [19]

Nakano et al.

[11] 4,275,379
[45] Jun. 23, 1981

[54] TRAFFIC INDICATOR

[75] Inventors: Tasuku Nakano, Gifu; Tadanao Hamamoto, Nagoya, both of Japan

[73] Assignee: Kabushiki Kaisha Tokai Rika Denki Seisakusho, Aichi, Japan

[21] Appl. No.: 34,994

[22] Filed: May 1, 1979

[30] Foreign Application Priority Data

May 1, 1978 [JP] Japan .................................. 53-52450

[51] Int. Cl.³ ............................................. B60Q 1/42
[52] U.S. Cl. .................................. 340/81 R; 340/55; 340/55
[58] Field of Search .............. 340/55, 73, 81 R, 81 F, 340/56

[56] References Cited

U.S. PATENT DOCUMENTS

| | | | |
|---|---|---|---|
| 3,914,737 | 10/1975 | Sato | 340/55 |
| 3,925,758 | 12/1975 | Holt | 340/73 |
| 3,955,175 | 5/1976 | Holt | 340/73 |

FOREIGN PATENT DOCUMENTS

| | | | |
|---|---|---|---|
| 2460918 | 6/1976 | Fed. Rep. of Germany | 340/56 |
| 2725805 | 12/1978 | Fed. Rep. of Germany | 340/73 |

*Primary Examiner*—Donald J. Yusko
*Attorney, Agent, or Firm*—Koda and Androlia

[57] ABSTRACT

A traffic indicator for an automobile which may automatically cancel the flush signal on the indicator lamps without using a switch lever under electronic control. The traffic indicator comprises a sensor circuit for sensing the direction of the rotation of the steering wheel to provide cancel signals to a right latch circuit when the steering wheel gets from the right back to a point from a point at a certain distance from the neutral position, and to a left latch circuit when the steering wheel gets from the left back to a point from a certain distance from the neutral position. The interval of the flush signals from a flushing circuit may be changed by signals given from the outside such that a disconnection sensing circuit may be provided to change the interval of the flush signals in case of an emergency.

12 Claims, 18 Drawing Figures

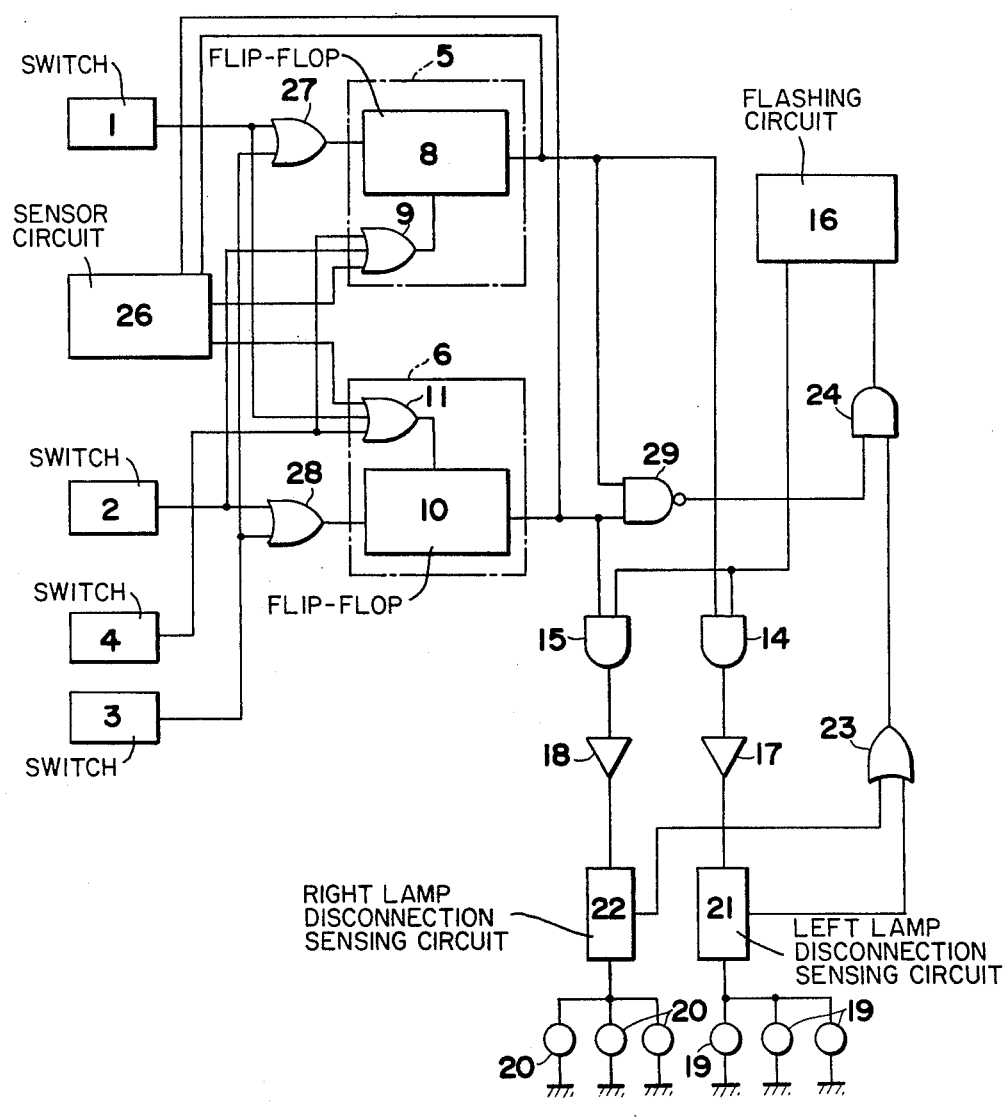

TRAFFIC INDICATOR

BACKGROUND OF THE INVENTION

1. Field of the Invention

This invention relates to a traffic indicator for an automobile, and more particularly to an electronic traffic indicator which does not require a switch lever.

2. Prior Art

In the last several years, there has been a strong demand for safety for passengers in case of traffic accidents. For this purpose, there have been made a number of proposals such as a seatbelt and an air-bag to prevent a passenger from crashing into a steering wheel. In addition to those proposals, a consideration has been given to render the structure of the steering wheel flexible. Further, it is also suggested that all the projections extending inwardly from the automobile body, such as a switch lever for a traffic indicator. The switch lever for a traffic indicator provides the biggest problem to shift all the switches from the steering column to some other area of the automobile. In other words, the switch lever constitutes a right-left switch such that the switch is automatically cancelled by the rotation of the steering, which makes it difficult to shift the lever away from the steering column.

SUMMARY OF THE INVENTION

Accordingly, it is the primary object of this invention to provide a traffic indicator which is operated under electronic control without having a switch lever.

In keeping with the principles of this invention, the objects are accomplished by a unique combination including a momentary right switch for a right side signal, a momentary left switch for a left side signal, a right latch circuit to latch signals from the right switch, a left latch circuit to latch signals from the left switch, a flash circuit to provide flush signals, a right lamp to flash responding to signals from the flash circuit upon turning on the right switch, a left lamp to flash responding to signals from the flash circuit upon turning on the left switch, and a sensor circuit to sense the direction of the rotation of a steering wheel such that the sensor circuit provides a reset signal to the right latch circuit when the steering wheel being rotated beyond a certain point toward its neutral position from its right oriented position, and provides a reset signal to the left latch circuit when the steering wheel being rotated beyond a certain point toward its neutral position from its left oriented position.

It is preferable to arrange the flash circuit to change the flashing frequency in accordance with a signal given by a disconnection sensing circuit for each one of the right and left lamps, so that the flashing frequency be changed in case either the right or left lamp is disconnected.

BRIEF DESCRIPTION OF THE DRAWINGS

FIG. 6 B shows a plan view of the sensor circuit in FIG. 6 A; FIG. 6 C shows a circuit diagram of the sensor circuit in FIG. 6 A.

FIG. 7 B shows a plan view of the sensor circuit in FIG. 7 A; FIG. 7 C shows a circuit diagram of the sensor circuit in FIG. 7 A.

FIGS. 9 and 10 show another embodiments of the traffic indicator of this invention.

DETAILED DESCRIPTION OF THE INVENTION

Figure 1:
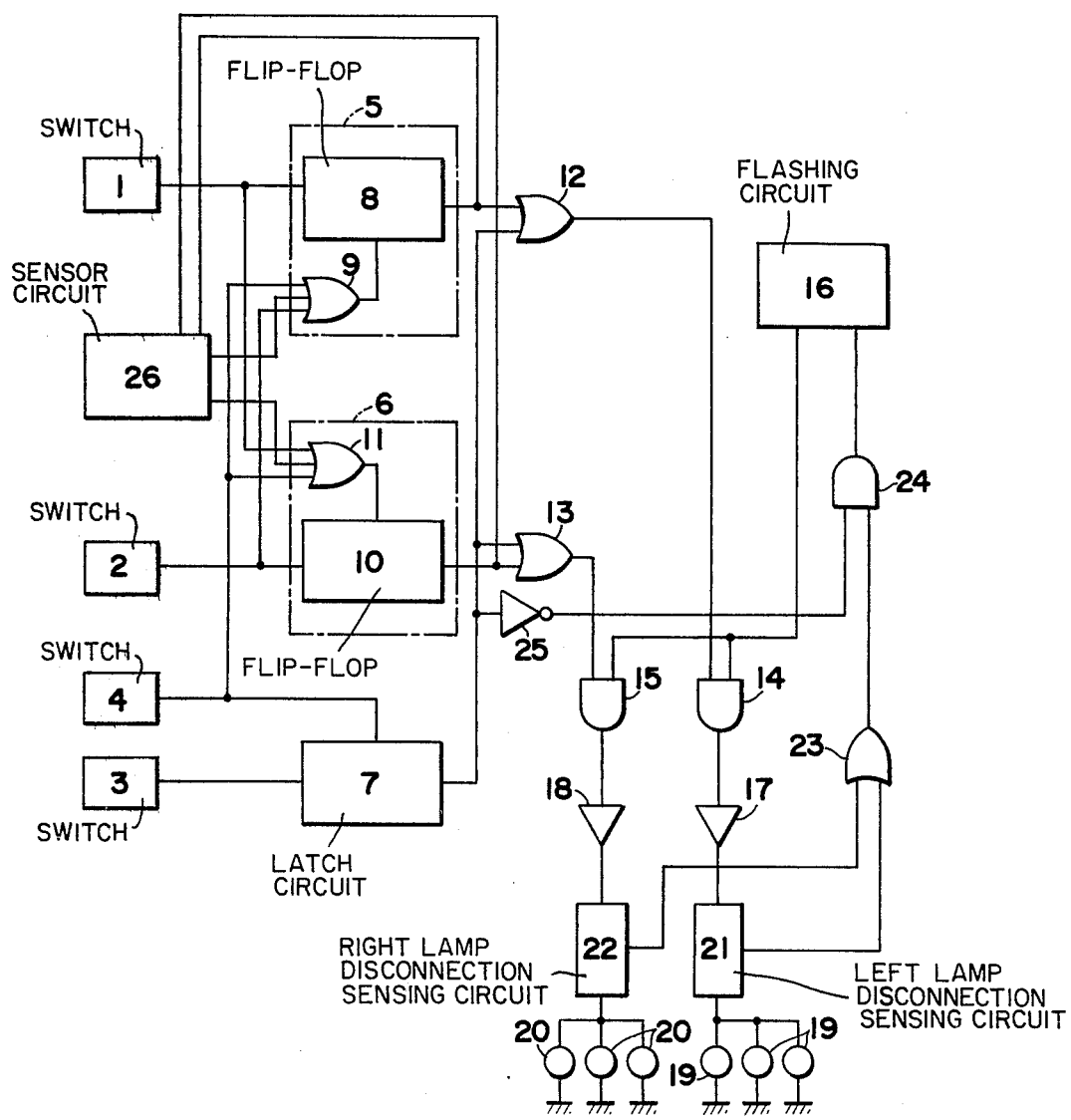
FIG. 1 shows a block diagram of an embodiment of the traffic indicator of this invention.

Referring first to FIG. 1, numeral 1 designates a momentary left switch for providing left side signals, and numeral 2 designates a momentary right switch for providing right side signals, where signals from the left switch 1 are to be sent to a left latch circuit 5 and signals from the right switch 2 are to be sent to a right latch circuit 6. Numeral 3 designates a hazard switch to flash both right and left signal lamps at emergency. Signals from the hazard switch 3 are to be sent to a hazard latch circuit 7. Numeral 4 designates a momentary neutral switch for cancelling signals either regular or hazard. The output from the neutral switch 4 is to be sent to the left latch circuit 5, the right latch circuit 6 and the hazard latch circuit 7 as cancel signal. Those momentary switches 1, 2, 3 and 4 may be arranged as shown in FIGS. 2 A and B.

Figure 2A:
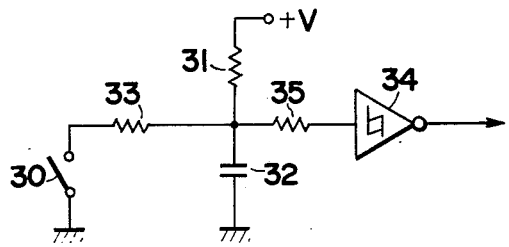
FIGS. 2 A and B show a circuit diagram of a switch of the traffic indicator.
Figure 2B:
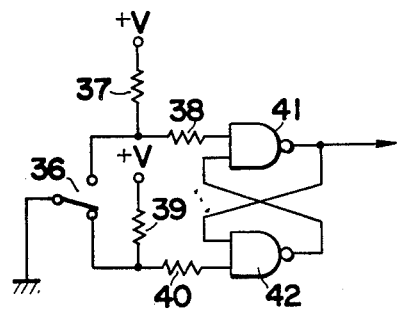

In FIG. 2 A numeral 30 designates a momentary switch, numerals 31 and 32 designate a resistor and a condenser which form a chattering absorbing circuit, a numeral 33 designates a resistor for preventing discharge from the condenser 32, numeral 34 designates an inverter with Schmidt function for forming dull signal waves from the chattering absorbing circuit into inverted sharp waves, and numeral 35 designates a protective resistor for the inverter 34 with Schmidt function.

In FIG. 2 B shows a chattering absorbing circuit comprising a momentary switch 36, a resistors 37, 38, 39 and 40, and 2-input NAND gates 41 and 42.

Figure 3A:
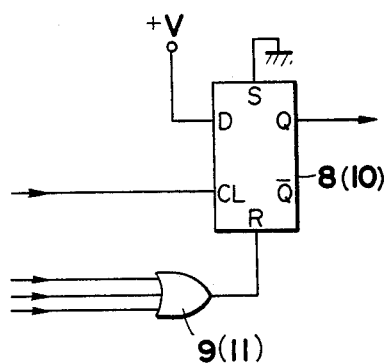
FIGS. 3 A and B show a circuit diagram of a left latch circuit and a right latch circuit.
Figure 3B:
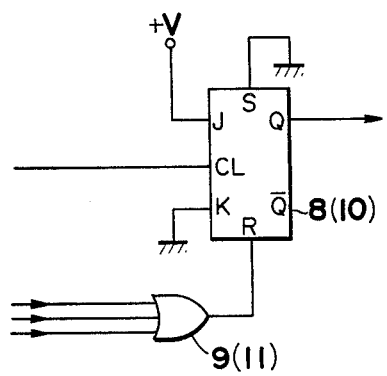

The left latch circuit 5 and right latch circuit 6 may be formed as shown in FIGS. 3 A and B for example referring to FIG. 3 A, the left latch circuit 5 comprises a D-type flip-flop 8 or 10 receiving latch signals at its clock end CL and cancel signals at its reset end R via an OR gates 9 or 11. Referring to FIG. 3 B, the right latch comprises a J-K type flip-flop 8 or 10 receiving latch signals at its clock end CL and cancellation signals at its reset end R via OR gate 9 or 11.

The left latch circuit 5 latches signals from the left switch 1 and also receives cancel signals from the right switch 2, the neutral switch 4 and a sensor circuit 26 for sensing the direction of the rotation of the steering wheel. The right latch circuit 6 latches signals from the right switch 2 and receives cancellation signals from the left switch 1, the neutral switch 4 and the sensor circuit 26 for sensing the direction of the rotation of the steering wheel. The hazard latch circuit 7 is so arranged as to latch signals from the hazard switch 3 and to be cancelled by signals from the neutral switch 4. The latch circuit 7 may comprise, for example, either a D-type flip-flop as shown in FIG. 3 A or a J-K type flip-flop as shown in FIG. 3 B. The output of the left latch circuit 5 or the hazard latch circuit 7 is connected to one end of the 2-input AND gate through the OR gate 12. The output of the right latch circuit 6 or the hazard latch circuit 7 is connected to one end of the 2-input AND gate 15 through the OR gate 13.

Numeral 16 designates a flashing circuit for generating flash signals for the lamps. The flash signals from the flashing circuit 16 is to be sent to the AND gates 14 and 15. The flash signals sent to the AND gate 14 are to pass through the AND gate 14 and to be amplified by a driver 17 only when the OR gate 12 is on, whereby the left lamp 19 flashes. Similarly, the flash signals sent to the AND gate 15 are to pass through the AND gate 15 and to be amplified by a driver 18 only when the OR gate 13 is on, whereby the right lamp flashes. The drivers 17 and 18 are amplifiers to drive the right and left lamps and comprise well-known elements, such as a relay, transistors and gate-turn-off thyristors. Numeral 21 designates a disconnection sensing circuit for the left lamps disposed between the driver 17 and the left lamp 19; numeral 22 designates a disconnection sensing circuit for the right lamp disposed between the driver 18 and the right lamp 20. The signals sensed by the sensing circuits 21 and 22 are sent to the flashing circuit 16 through an OR gate 23 and an AND gate 24 causing the flashing frequency changed. The disconnection sensing circuits 21 and 22 may, for example, be built as shown in FIG. 4.

Figure 4:
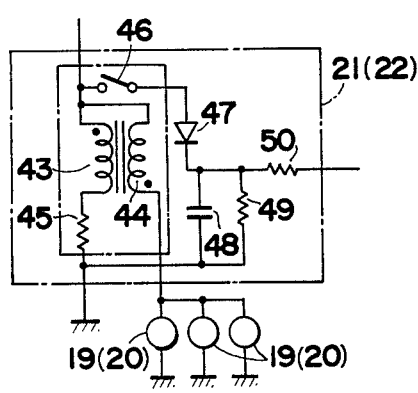
FIG. 4 shows a circuit diagram of a disconnection sensing circuit for sensing connection of lamps.

Now referring to FIG. 4, there are provided a circuit for transferring flash signals from the drivers 17 and 18 to a resistor 45 through a relay coil 43, and a circuit for transferring such signals to the left lamp 19 or the right lamp 20 through a relay coil which is oriented adversely to the relay coil 43. The relay coils 43 and 44 are so arranged as to counterbalance to each other, unless there is any disconnection on either the left lamp 19 or the right lamp 20. In case there occurs a disconnection on any of the left lamps 19 and the right lamps 20, the balance between the relay coil 43 and the relay coil 44 is lost. Thereby causing a relay contact 46 to get on. The ON signal from the relay contact 46 is given through a diode 47 to an integral circuit comprising a condenser 48, resistors 49 and 50. The integral circuit will distinguish any disconnection sign from other signs, and provides signals when sensing a disconnection sign. The flashing circuit 16 may be built, for example, as shown in FIGS. 5A, B and C.

Figure 5A:
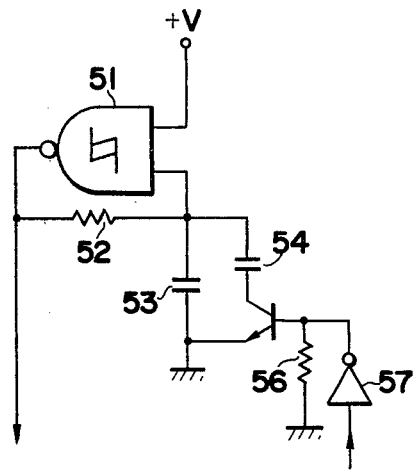
FIGS. 5 A through C show a circuit diagram of a flash circuit.

Referring to FIG. 5A, there is shown an oscillator circuit with a NAND gate having Schmidt function. Numeral 51 designates a NAND gate with Schmidt function; numerals 52, 53 and 54 designate resistors and condensers which form a time constant circuit; numeral 55 designates a transistor; numeral 56 designates a base resistor; numeral 57 designates an inverter for receiving disconnection signals from the disconnection sensing circuit. In this circuit, when the inverter 57 is not receiving disconnection signals, the transistor 55 turns on, whereby the circuit sends oscillation output as flashing signals as set by the time constant based on the transistor 52 and the condensers 53 and 54. When the inverter receives disconnection signals, the transistor 55 turns off to cut off the condenser 54 from the time constant circuit causing oscillation at a higher frequency.

Figure 5B:
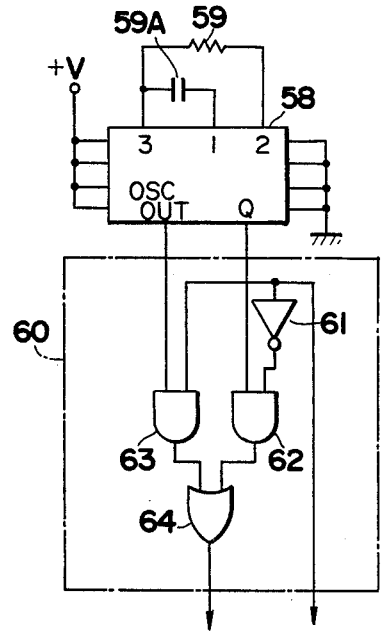

Referring to FIG. 5B, numeral 58 designates an oscillation circuit (a typical model for this is "CD4047" by RCA); numerals 59 and 59A designate a resistor and a condenser which form a time constant circuit. In this oscillator circuit 58, the frequency from the OSC OUT end is twice as high as the frequency from the Q end. Numeral 60 designates a switch circuit for switching between Q output and OSC OUT output. The switch circuit 60 comprises an inverter 61, AND gates 62 and 63, and an OR gate. When there is no disconnection signals, Q output from the oscillator circuit 58 is sent as flashing signals through the AND gate 62 and the OR gate 64. On the other hand, when there is disconnection signals given, output from OSC OUT end is sent as flashing signals through the AND gate 63 and the OR gate 64.

Figure 5C:
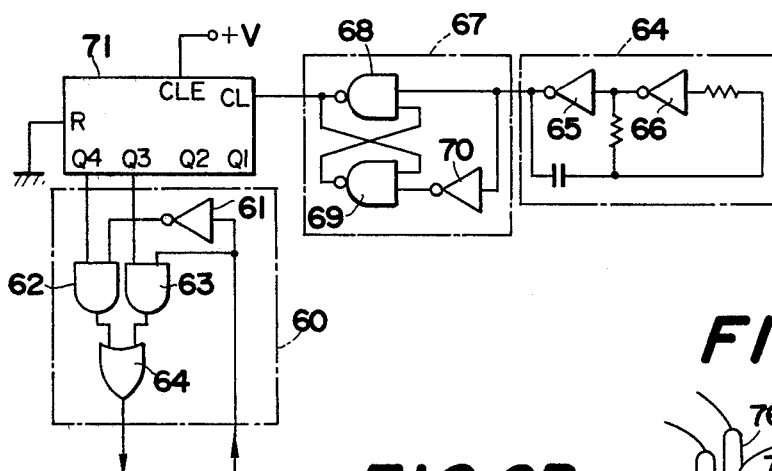

Referring to FIG. 5C, numeral 64 designates an oscillator circuit comprising inverters 65 and 66; numeral 67 designates a wave modifying circuit comprising NAND gates 68 and 69 and an inverter 70; numeral 71 designates a four stage UP counter. In this circuit, when there is no disconnection signal, $Q_4$ output from the counter 71 is sent as flashing signals through the AND gate 62 and the OR gate 64 of the switch circuit 60. When there is any disconnection signal ocurred, $Q_3$ output from the counter 71 is sent through the AND gate 63 and the OR gate 64. The frequency of $Q_3$ output is twice as high as that of $Q_4$ output.

The output from the hazard latch circuit 7 is to be sent to the AND gate 24 through the inverter 25. When the hazard latch circuit 7 has output, the AND gate 24 is so set to be closed, whereby disconnection signals are not input to the flashing circuit 16. In other words, even when either of the disconnection sensing circuits 21 or 22 senses any disconnection on the lamps, the frequency of the flash signals from the flashing circuit 16 will not change upon pushing the hazard switch 3. Numeral 26 designates a sensing circuit for the direction of the rotation of the steering wheel. The sensing circuit 26 provides cancel signals to the left latch circuit 5 or the right latch circuit 6 when the steering wheel gets back to a point at a certain distance from its neutral position.

Figure 6A:
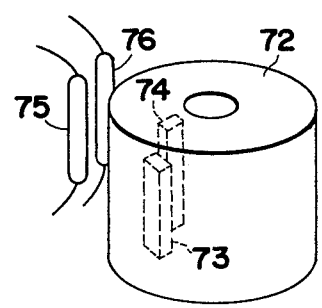
FIG. 6 A shows a perspective view of a sensor circuit for sensing the direction of the rotation of the steering wheel.

There are shown embodiments of the sensing circuit 26 in FIG. 6A-FIG. B.

Figure 6B:
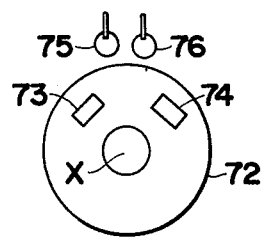
Figure 6C:
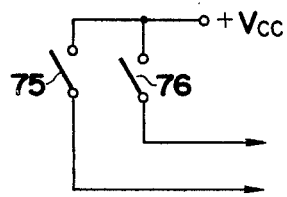

FIGS. 6A and B show a sensor using a lead switch. A cylindrical magnet holder 72 is fixed to the steering wheel to rotate together. The magnet holder 72 is provided with two magnets 73 and 74 around the axis X. Numeral 75 and 76 designate reed switches disposed at a certain distance from the magnet holder 72. These reed switches 73 and 74 are so arranged to be located between the two magnets 73 and 74, when the steering wheel is held at its neutral position. The reed switches 75 and 76 have an electrical connection such that each one of them has an end connected to a power source Vcc and the other end set to output ON signals, as shown in FIG. 6C. When the steering wheel is at its neutral position (as in FIG. 6B), the reed switches 75 and 76 are not magnetized by the magnets 73 and 74 to be kept OFF. When the steering wheel is rotated to the right at a certain angle, the magnet 73 gets close to the reed switch 75 and turns it on. When the steering wheel is rotated further, the magnet 73 gets closer to the reed switch 76 and turns it on. The reed switch 75 is so arranged to be kept on, when the reed switch 76 turns on. When the steering wheel is rotated, the reed switches 75 and 76 get off in the order.

When the steering wheel starts to return to its neutral position, the reed switch 76 turns on first and then the reed switch 75 turns on. When the steering wheel further returns, the reed switch 76 turns off and then the reed switch 75 turns off.

When the steering wheel is rotated to the left and back to its neutral position, the reed switches 75 and 76 function in the opposite order. Therefore, in this sensor circuit, when the steering wheel rotated to the right returns to its neutral position, the reed switches 75 and 76 are turned on in this order, while they are turned on in the reversed order, when the steering wheel returns to its neutral position from the left.

The angle of the steering wheel, where the reed switches 75 and 76 turn on, may be adjusted by changing the position of the magnets 73 and 74.

Figure 7A:
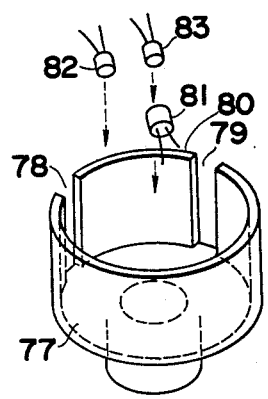
FIG. 7 A shows a perspective view of another embodiment of the sensor circuit.
Figure 7B:
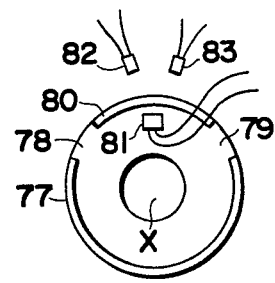
Figure 7C:
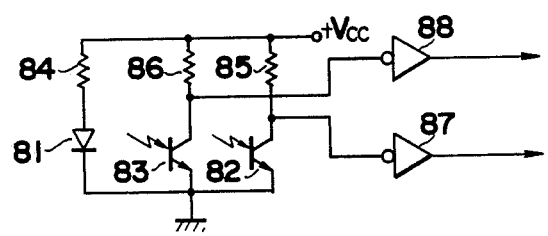

There is shown a sensor circuit optically oriented in FIGS. 7A and B. A cylinder 77 is set to rotate together with the steering shaft. The cylinder 77 is provided in the side with two recesses 78 and 79 with a certain distance therebetween. In the inside of the side 80 of the cylinder 77 there is disposed a light emittance diode 81 and in the outside there are disposed two photo transistors 82 and 83. When the steering wheel is at the neutral position, the light emittance diode 81 and the photo transistors 82 and 83 are located in the middle of the side 80, so that the light from the light emittance diode 81 is shut off by the side 80 (FIG. 7B). The light emittance diode 81 and the photo transistors 82 and 83 are electrically connected as shown in FIG. 7C. In other words, the light emittance diode 81 and the photo transistors 82 and 83 are connected to a power source Vcc through resistors 84, 85 and 86 respectively. The output of the photo transistors 82 and 83 is transferred out through inverters 87 and 88 respectively. The function of the sensor circuit thus formed is the same as the one shown in FIGS. 6A and B. In other words, when the steering wheel is rotated to an angle toward the right, the recess 78 gets to a point between the light emittance diode 81 and the photo transistors 82, whereby the light from the light emittance diode 81 reaches the photo transistor 82 to get the inverter 87 on. When the steering wheel is rotated further, the light from the light emittance diode 81 reaches the photo transistor 83 to get the inverter 88 on. At this stage the light from the light emittance diode 81 still gets to the photo transistor 82. Thereafter, when the steering wheel is further rotated, the photo transistor 82 turns off causing the inverter 87 to get off. When the steering wheel thus rotated to the right is rotated back to the neutral position, the photo transistors 83 and 82 turn on in this order and then they turn off in the same order. When the steering wheel is rotated to the left and back to the neutral position, it functions in the reverse order. Therefore, as seen in the sensor circuit of FIGS. 6A and B, the inverters 88 and 87 get on in this order when the steering wheel returns to the neutral position from the right, while the inverters 88 and 87 get on in the reversed order when the steering wheel returns from the left. In the sensor circuit, it is also possible to use electromagnetic transformation elements such as hole elements instead of the reed switches and the photo transistors.

Figure 8:
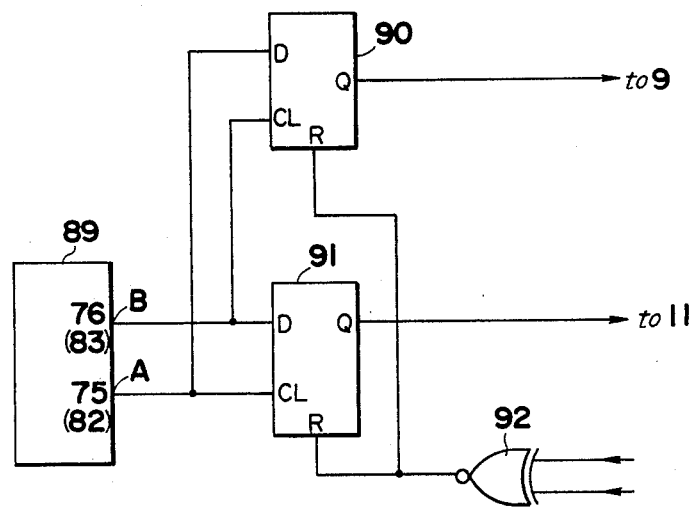
FIG. 8 shows a circuit diagram of a circuit to provide signals for cancelling right and left latch circuits.

FIG. 8 shows a circuit for generating cancel signals to be sent to the left latch circuit 5 or the right latch circuit 6. Numeral 89 designates a sensor circuit for sensing the direction of the rotation of the steering wheel mentioned above in the form of a black box. An output end A provides ON signals for the reed switch 75 or the photo transistor 82, while the other output end B provides ON signals for the reed switch 76 or the photo transistor 83. Numerals 90 and 91 designate D-type flip-flops which form a switching circuit for turning on and off responding to the output from the sensor circuit 89. The flip-flop 90 receives signals from the output end A as D-input and signals from the output end B as clock-input, such that Q output is sent to the OR gate 9 of the left latch circuit 5. The D-type flip-flop 91 receives contrary to the flip-flop 90. B-output as D-input and A output as clock-input, such that Q-output is sent to the OR gate 11 of the right latch circuit 6. An exclusive NOR gate 92 is to receive output from the left latch circuit 5 and the right latch circuit 6. The NOR gate 92 will send reset signals to the D-type flip-flops 90 and 91 when output from the latch circuits 5 and 6 are both 0 or 1. When the steering wheel is rotated from the neutral position to the right, output comes out from the output ends A and B in this order. Thus receiving the signals, Q-output of the D-type flip-flop 90, 1 will become 1 with the initial output of the B end. At this time Q output of the flip-flop 91 will not be 1. When the steering wheel is further rotated to the right, output of the censor circuit 89 gets back to 0 in the order of the A and the B end. However, there is seen no change in the output of the flip-flops 90 and 91. When the steering wheel returns to the neutral position, the output of the sensor circuit 89 will get on in the order of the B end and the A end. This will cause the flip-flop 91 to have output. When the steering wheel gets further close to the neutral position, the output of the sensor circuit 89 will get on in the order of the B end and the A end. This will cause the flip-flop 91 to have output. When the steering wheel gets further close to the neutral position, the output of the sensor circuit 89 gets off in the order of the B end and the A end, which will not cause any changes in the output of the flip-flops 90 and 91. Accordingly, in this circuit, when the steering wheel rotates to the right from the neutral position, the flip-flop 90 has output, while the flip-flop 91 has output, when the steering wheel gets back to the neutral position. Contrary to this, the flip-flop 91 has output, when the steering wheel is rotated to the left, while the flip-flop 90 has output, when the steering wheel gets back to the neutral position.

Now here is given an explanation on the operation of the whole traffic indicator of this invention with reference to FIG. 1. When the left switch 1 is pressed, signals therefrom are latched by the left latch circuit 5 causing output from the left latch circuit 5 is sent to the AND gate 14 through the OR gate 12. Thus, the flash signals from the flashing circuit 16 pass through the AND gate 14, get amplified by the driver 17, and be sent to the left lamp 19, whereby the left lamp will flash at a present interval. When the steering wheel is rotated to the left, the sensor circuit 26 sends cancel signals to the right latch circuit 6 which will not get any charges, since the latch circuit 6 is not in the latch state. When the steering wheel returns to the neutral position, the sensor circuit 26 sends cancel signals to the left latch circuit 5. The left latch circuit 5 in the latch state is cancelled by the cancel signals, whereby the AND gate receives no output causing the left lamp to terminate flashing. Contrary to this, when the right switch 2 is pressed, the signal is latched by the right latch circuit 6, where the output from the right latch circuit 6 is sent to the AND gate 15 through the OR gate 13. Thus, flash signals from the flashing circuit pass through the AND gate, get amplified by the driver 18, and are sent to the right lamp 20 causing the lamp 20 to flash at a preset interval. When the steering wheel is rotated to the right, the sensor circuit 26 sends cancel signal to the left latch circuit 5, which will not get any effect, since it is not in the latch state. When the steering wheel returns to the neutral position, the sensor circuit 26 sends cancel signal to the right latch circuit 6. Thus, the right latch circuit in the latch state will be cancelled to have no output for the AND gate 15, which causes the right lamp to terminate flashing. If the disconnection sensing circuits 21 or 22 senses any disconnection, such signal is sent to the flashing circuit 16 through the OR gate 23 and the AND gate 24 causing the interval of flashing to change. Thus, the flashing circuit 16 provides flash signal with a different interval to cause the left lamp 19 or the right lamp 20 to flash at an unusual flashing interval. Thus, the driver of the automobile will notice such disconnection on the indicator. In the case of emergency, by pushing the hazard switch 3, the signal is latched by the hazard latch circuit 7 whose output is sent to the AND gates 14 and 15 through the OR gates 12 and 13 causing both the left lamp 19 and the right lamp 20 to flash at the same time. When the left lamp 19 and the right lamp 20 are flashing in response to the output from the hazard latch circuit 7, the flashing circuit 1 will not change its flashing interval even in case the sensing circuit 21 or 22 senses any disconnection, since the output of the hazard latch circuit 7 closes the AND gate 24 through the inverter 25. Therefore, in this embodiment, the flashing interval will not change even at any disconnection, when the automobile is in an emergency. If the neutral switch 4 is pressed when the left lamp 19 is flashing in response to the signal from the left latch circuit 5, the right lamp 20 is flashing in response to the signal from the right latch circuit 6, or both the left and right lamps 19 and 20 are flashing in response to the signal from the hazard latch circuit 7, the left and right lamps 19 and 20 will terminate flashing, since the latch circuits 5, 6 and 7 are cancelled.

Figure 9:
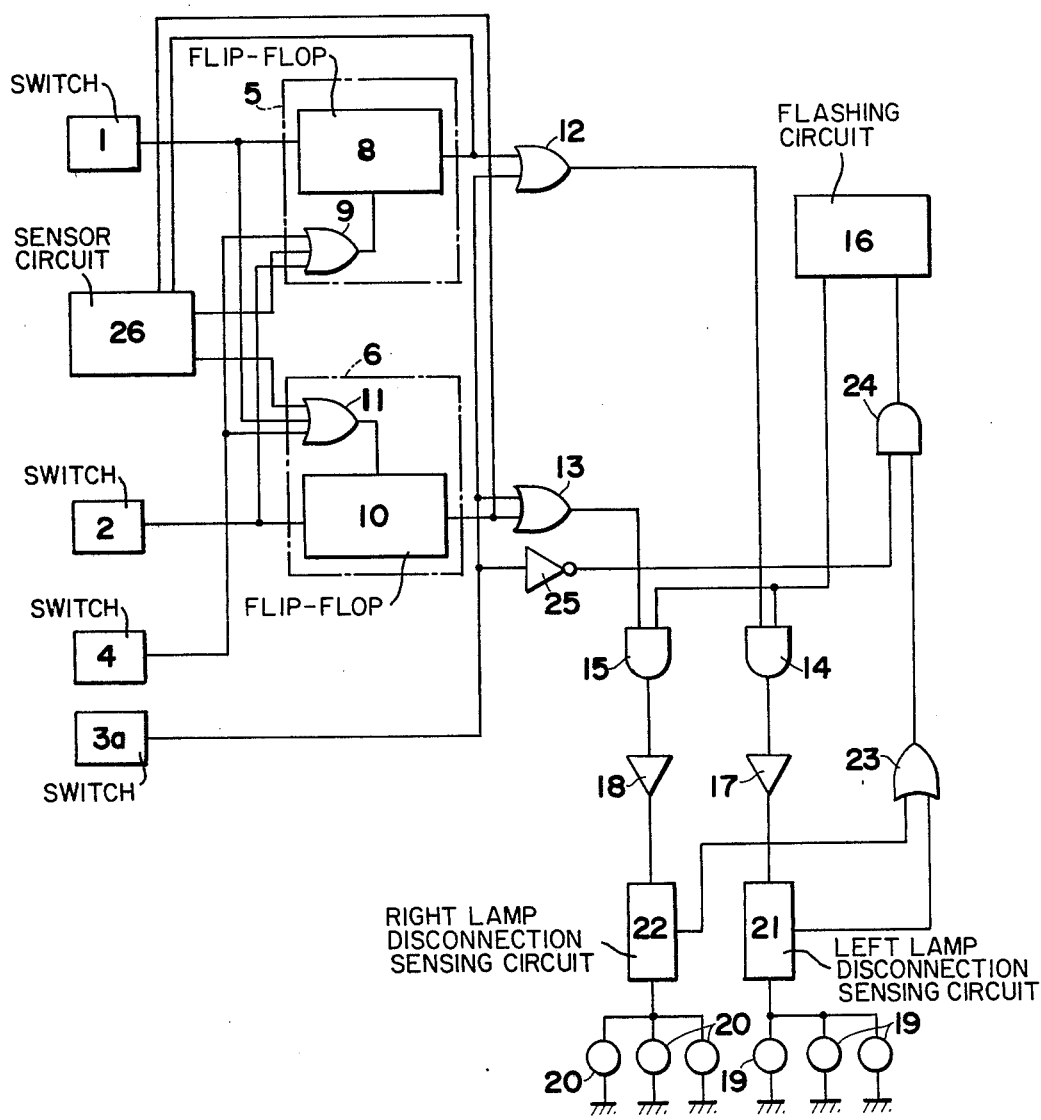

FIG. 9 shows another embodiment of this invention where a hazard switch 3a is formed of a toggle switch abbreviating the hazard latch circuit. In this circuit, since the hazard state can be released by pushing the hazard switch 3a, the neutral switch 4 is so designed to send its output only to the left latch circuit 5 and the right latch circuit 6.

FIG. 10 shows another embodiment of this invention, where the hazard switch 3 is so designed to get both the left and right latch circuits 5 and 6 to latch at the same time, thereby abbreviating the hazard latch circuit. In other words, the circuit is so arranged that the hazard switch 3 sends its output to the left and right latch circuit 5 and 6 through the OR gate 27 or 28 respectively as latch signals. By thus arranging, the OR gates 12 and 13 are abbreviated, and the output of the left latch circuit 5 and the right latch circuit 6 is sent to 2 input NAND gate 29 whose output is sent to the AND gate 24. The NAND gate 29 will open the AND gate 24, when either one of the left or right latch circuits 5 or 6 is on, so that disconnection signal sensed by the disconnection sensing circuits 21 or 22 is sent to the flashing circuit 16. On the other hand, when the left latch circuit 5 and the right latch circuit 6 have output at the same time by pushing the hazard switch 3, the AND gate will be closed to keep the interval at the flashing circuit 16 unchanged.

As explained above, this invention provides a traffic indicator for an automobile which does not need a switch lever and allows the indicator lamps to be flashing and be cancelled under electronic control.

We claim:

1. A traffic indicator for an automobile comprising:
a momentary right switch for giving signals for a right turn signaling,
a momentary left switch for giving signals for a left turn signaling,
a right latch circuit for latching signals given by said right switch,
a left latch circuit for latching signals given by said left switch,
a flashing circuit for generating flash signals,
at least one indicator lamp coupled to an output of at least one of said right or left latch circuits for flashing when said right or left latch circuits generates an output, and
a sensor circuit for sensing the direction of the rotation of the steering wheel, said sensor circuit generating signals to reset said right latch circuit when said steering wheel returns from the right to a point at a certain distance from the neutral position, and signals to reset said left latch circuit when said steering wheel returns from the left to a point at a certain distance from the neutral position, said sensor circuit comprising a photo transistor opposite a light emitting diode and a cylinder having at least one opening therein coupled to said steering wheel and extending between the light emitting diode and said photo transistor, said photo transistor turns on and off in response to light from said light emitting diode as the steering wheel is rotated and a switch circuit which turns on and off in response to at least two outputs of said photo transistor and sends cancel signals to right or left latch circuits.

2. A traffic indicator according to claim 1, further comprising a disconnection sensing circuit for sensing any disconnection on said right lamp, said circuit providing signal to change the interval of flashing signals from said flashing circuit and a disconnection sensing circuit for sensing any disconnection on said left lamp, said circuit providing signal to change the interval of flashing signals from said flashing circuit.

3. A traffic indicator according to claim 1, further comprising a hazard switch for causing both said right and left indicator lamps to flash at an emergency.

4. A traffic indicator according to claim 3, further comprising a momentary neutral switch for cancelling the flashing state and the hazard state on said right and left indicator lamps.

5. A traffic indicator according to claim 2, wherein said flashing circuit is so set to provide flash signals at a preset frequency when there is no disconnection signal sensed, and to provide flash signals at a different frequency when there is a disconnection signal sensed.

6. A traffic indicator according to claim 3, wherein said hazard switch is a toggle switch.

7. A traffic indicator according to claim 3, wherein said left and right latch circuits can latch at the same time with the output from said hazard switch.

8. A traffic indicator for an automobile comprising:
a momentary right switch for giving signals for a right turn signaling,
a momentary left switch for giving signals for a left turn signaling,
a right latch circuit for latching signals given by said right switch,
a left latch circuit for latching signals given by said left switch,
at least one indicator lamp coupled to an output of at least one of said right or left latching circuits for flashing when said right or left latching circuits generates an output, a disconnection sensing circuits for sensing any disconnection of said indicator lamp and for generating a disconnection signal when disconnection of said indicator lamp is sensed, a flashing circuit for generating flash signals, said flashing circuit being arranged and configured to provide flash signals at a preset frequency when there is no disconnection signal sensed and to provide flash signals at a different frequency when there is a disconnection signal sensed, a sensor circuit for sensing the direction of the rotation of the steering wheel, said sensor circuit generating signals to reset said right latch circuit when said steering wheel returns from the right to a point at a certain distance from the neutral position, and signals to reset said left latch circuit when said steering wheel returns from the left to a point at a certain distance from the neutral position, said circuit comprising a photo transistor opposite a light emitting diode and a cylinder having at least one opening therein coupled to said steering wheel and extending between said light emitting diode and said photo transistor, said photo transistor turns on and off in response to light from said light emitting diode as said steering wheel is rotated and a switch circuit which turns on and off in response to these two outputs of said photo transistor and sends cancel signals to said right or left latch circuit, a hazard switch for causing said indicator lamp to flash during an emergency, and a momentary neutral switch for canceling the flashing state and the hazard state.

9. A traffic indicator according to claim 2, wherein said latch circuits comprise flip-flops, such that said left latch circuit is cancelled by cancel signals from said right switch, neutral switch, and sensor circuit for sensing the direction of the rotation of the steering wheel.

10. A traffic indicator according to claim 2, wherein said disconnection sensing circuit is so set to send signal to said flashing circuit to change the flashing interval at said right or left indicator lamp upon sensing any disconnection.

11. A traffic indicator according to claim 2, wherein said disconnection sensing circuit comprises a pair of relay coils oriented oppositely to each other, a relay contact to turn on when the balance between the two relay coils is lost, and an integral circuit for providing disconnection signal upon sensing any disconnection on said lamps based upon signals from said relay contact.

12. A traffic indicator according to claim 7, wherein said switch circuit comprises a flip-flop.

* * * * *